(12) United States Patent
Ono et al.

(10) Patent No.: US 9,065,319 B2
(45) Date of Patent: Jun. 23, 2015

(54) ELECTRIC MOTOR (75) Inventors: Junya Ono, Wako (JP); Kazuhiko Nakamura, Wako (JP); Yasushi Fujimoto, Wako (JP); Makoto Fujikubo, Wako (JP); Naoki Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 13/616,085

(22) Filed: Sep. 14, 2012

(65) Prior Publication Data
US 2013/0082558 A1    Apr. 4, 2013

(30) Foreign Application Priority Data

Sep. 29, 2011   (JP) ................. 2011-214173

(51) Int. Cl.
*H02K 16/02* (2006.01)
*H02K 7/116* (2006.01)
*H02K 21/02* (2006.01)
*H02K 7/14* (2006.01)

(52) U.S. Cl.
CPC .............. *H02K 21/024* (2013.01); *H02K 16/02* (2013.01); *H02K 7/116* (2013.01); *H02K 7/14* (2013.01)

(58) Field of Classification Search
CPC ............................ H02K 16/02; H02K 16/025
USPC .......................................... 310/114
IPC ...................................... H02K 16/02
See application file for complete search history.

(56) References Cited

U.S. PATENT DOCUMENTS

| 6,700,268 B2* | 3/2004 | Joong et al. ................ 310/114 |
| 7,309,941 B2* | 12/2007 | Murota et al. ............. 310/268 |
| 7,518,277 B2* | 4/2009 | Nemoto et al. .......... 310/156.47 |

FOREIGN PATENT DOCUMENTS

WO    2004-088826    10/2004

* cited by examiner

*Primary Examiner* — Thomas Truong
(74) *Attorney, Agent, or Firm* — Rankin, Hill & Clark LLP (57) ABSTRACT

A rotor placed inside or outside of a stator in the radius direction includes a fixed rotor fixed in a position along a rotation axis of the rotor, and a movable rotor allowed to approach/separate from the fixed rotor and to move in a direction along the rotation axis.

18 Claims, 8 Drawing Sheets

ELECTRIC MOTOR

BACKGROUND OF THE INVENTION

1. Field of the Invention

The present invention relates to an electric motor including a stator and a rotor arranged at a predetermined spacing from the stator.

2. Description of the Related Art

An electric motor including a rotor and a stator that are arranged to face each other in an axis direction and moving the rotor in the axis direction to change the spacing from the stator is known from the WO2004/088826 Publication.

Now, in an electric motor used in an electric vehicle with wheels operated by an electric motor, a larger amount of magnetic flux is desired because high torque is required at vehicle start and a smaller amount of magnetic flux is desired because a high rotational speed is required during driving at high speed. However, in the disclosure in WO2004/088826 Publication, although the amount of magnetic flux is controlled, accuracy with which to control a gap between the rotor and the stator is not easily increased, which is considered to have effect on the performance of the electric motor.

SUMMARY OF THE INVENTION

The present invention has been made in light of such circumstances and an object of the present invention is to provide an electric motor that facilitates accuracy control, is capable of changing the amount of magnetic flux, and is less affected by variation in products.

In accordance with the present invention, an electric motor includes a stator and a rotor arranged at a predetermined spacing from the stator. The rotor is arranged inside or outside of the stator in a radius direction and a fixed rotor fixed in a position along a rotation axis of the rotor, and a movable rotor allowed to approach/separate from (i.e., move toward and away from) the fixed rotor and to move in a direction along the rotation axis. Since the rotor is placed inside or outside of the stator in the radius direction, even when the movable rotor moves, the spacing between the rotor and the stator is not changed, so that the accuracy control in assembly allows full use of predetermined performance capabilities. In addition, since the rotor is made up of the fixed rotor that is fixed in a position along the rotation axis and the movable rotor that is allowed to approach/separate from the fixed rotor, the amount of magnetic flux is able to be changed by the movement of the movable rotor, so that switching between a low-rotation high-torque motor and a high-rotation low-torque motor is allowed, making the performance capabilities of the low-rotation high-torque motor and the high-rotation low-torque motor noticeable. Furthermore, the division of the rotor in the axis direction offers a higher permeance coefficient, achieving an improvement in demagnetization toughness during the operation at high temperature.

In accordance with another aspect of the invention, a plurality of magnets is provided in each of the fixed rotor and the movable rotor and arranged at equal and regular intervals in a peripheral direction of the rotor, and a phase of each of the magnets of the fixed rotor and the movable rotor is defined such that the magnet of the fixed rotor and a magnet of the movable rotor facing this have the same polarity in a face-to-face area of the fixed rotor and the movable rotor. Since a magnet of the fixed rotor and a magnet of the movable rotor facing the magnet of the fixed rotor have the same pole in the face-to-face area of the fixed rotor and the movable rotor, whereby a repulsive force is generated between the fixed rotor and the movable rotor, thus facilitating separation of the movable rotor from the fixed rotor.

In accordance with another aspect of the invention, the plurality of magnets is provided in each of the fixed rotor and the movable rotor and arranged at equal and regular intervals in the peripheral direction of the rotor, and the magnets of the fixed rotor and the movable rotor are set out of phase such that the magnet of the fixed rotor and the magnet of the movable rotor partially face each other in the face-to-face area of the fixed rotor and the movable rotor. This makes it possible to reduce the cogging torque produced when external forces are used to rotate the rotor in non-energized conditions.

In further accordance with the present invention, the magnets of the fixed rotor and the magnets of the movable rotor are arranged out of phase such that a part of one of a north pole and a south pole of the magnets of the fixed rotor faces the other of a north pole and a south pole of the magnet of the movable rotor in the face-to-face area of the fixed rotor and the movable rotor. In the face-to-face area of the fixed rotor and the movable rotor, a part of one of the N and S poles of the magnet of the fixed rotor faces the other pole of the N and S poles of the magnet of the movable rotor. As a result, it is possible to reduce the cogging torque produced when external forces are used to rotate the rotor in non-energized conditions. In addition, a reduction in magnetic flux makes it possible to implement performance capabilities like a high-rotation low-torque motor.

In further accordance with the present invention, the fixed rotor and the movable rotor are identical in size with each other, and the fixed rotor and the movable rotor are formed to allow the rotor made up of the fixed rotor and the movable rotor to be arranged within a width along an axis of the stator in an initial state in which the movable rotor approaches closest to the fixed rotor. Since the fixed rotor and the movable rotor are identical in size, the magnets provided in the fixed rotor and the movable rotor are identical to each other, thus achieving commonality. Since the rotor is located within the width along the axis of the state in the initial state in which the movable rotor approaches closest to the fixed rotor, the rotor in the initial state is in the same environment as a conventional rotor that is not split and, therefore, is allowed to offer full performance capabilities.

According to another aspect of the invention, the movable rotor is formed to have a shorter length along an axis of the movable rotor than a length along an axis of the fixed rotor, and the fixed rotor and the movable rotor are formed to allow the rotor made up of the fixed rotor and the movable rotor to be arranged within the width along the axis of the stator in the initial state in which the movable rotor approaches closest to the fixed rotor. Since the movable rotor has a length along its axis shorter than the length along the axis of the fixed rotor, and the rotor is placed within the width along the axis of the stator in the initial state in which the movable rotor approaches closest to the fixed rotor, performance capabilities of the low-rotation high-torque motor and the high-rotation low-torque motor can be easily offered, and also the movable rotor is readily affected by the repulsive force in order to reduce the force required to move the movable rotor.

According to another feature of the invention, the movable rotor, which is arranged between the fixed rotor and a power transmission for transmitting rotational power of a motor shaft to which the fixed rotor is fixed to a driven member, is slidably supported by the motor shaft. Since the movable rotor is slidably supported by the motor shaft to which the fixed rotor is fixed, between a power transmission for transmitting power from the motor shaft to the driven member and the fixed rotor, this makes it possible to place the movable rotor between the fixed rotor and the power transmission with space efficiency.

Further, a moving range of the movable rotor is set to a range in which the movable rotor overlaps a part of the stator when viewed from a direction perpendicular to a central axis of the stator.

Accordingly, the performance of the electric motor can be varied while a distance of the movable rotor is minimized, resulting in a compact structure of the electric motor.

DETAILED DESCRIPTION OF THE PREFERRED EMBODIMENTS

Embodiments according to the present invention will be described with reference to the accompanying drawings. Incidentally, in the following description, each of the fore-and-aft, up-and-down and right-and-left directions shall refer to a direction when viewed from an occupant/rider on a motorcycle.

A first embodiment of the present invention will be described with reference to FIGS. 1-5. Initially, in FIG. 1, a vehicle-body frame F of an electric motorcycle, which is an electric vehicle, includes a head pipe 13 that steerably supports a front fork 11 having lower ends at which a front wheel WF is journaled and a bar-shaped steering handlebar 12 coupled to the front fork 11, a main frame 14 that extends rearward and downward at a gentle inclination from the head pipe 13, a down frame 15 that extends rearward and downward at a steep inclination from the head pipe 13, right and left center frames 16 that extend downward from a rear end of the main frame 14, right and left lower frames 17 that are formed integrally with the center frames 16 to connect the lower ends of the center frames 16 and the lower end of the down frame 15, right and left seat rails 18 that extend rearward from upper ends of the center frames 16, and rear frames 19 that connect lower portions of the center frames 16 and middle portions of the seat rails 18 closer to the rearward ends thereof.

Figure 1:
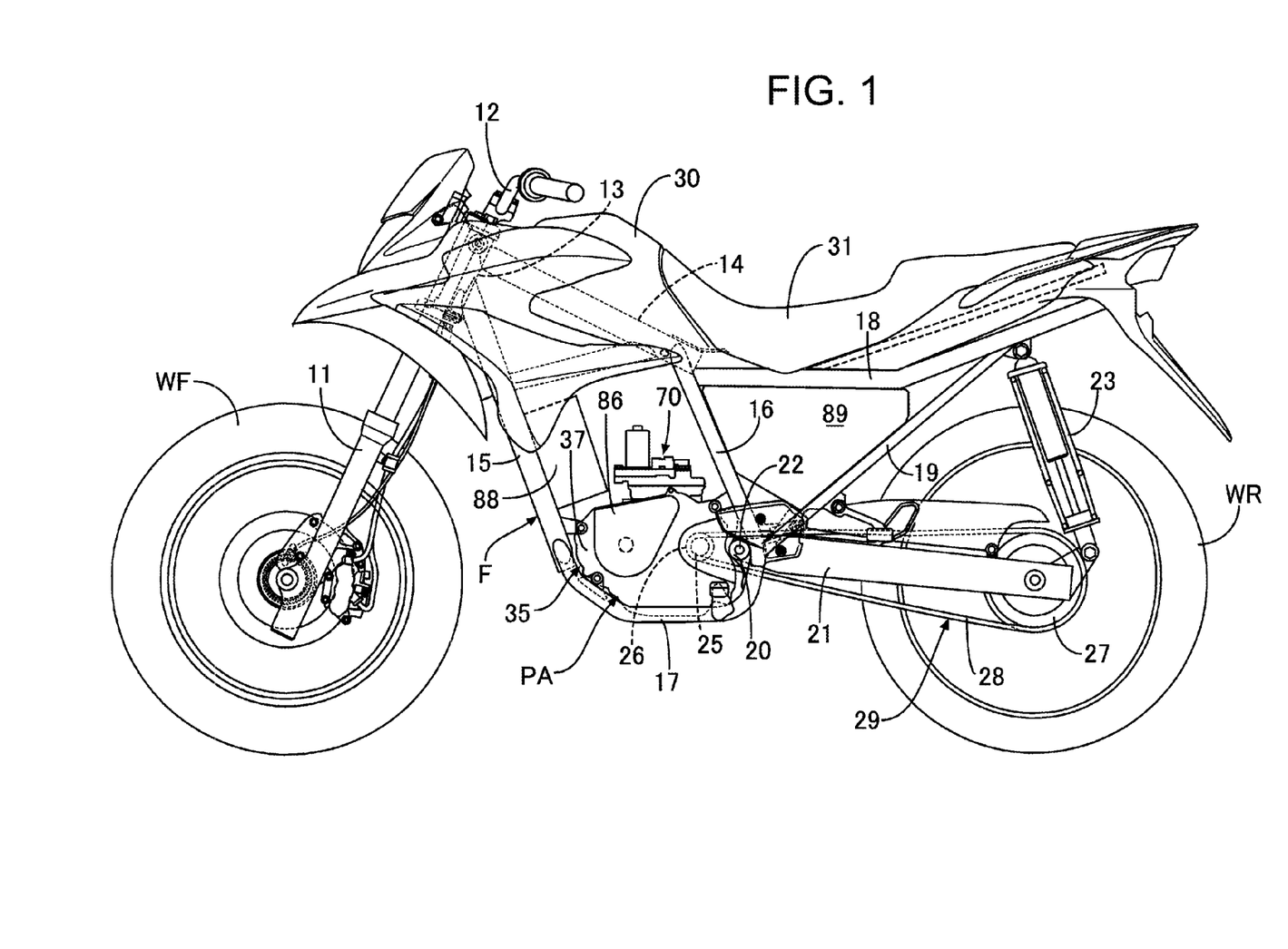
FIG. 1 is a side view of a motorcycle of a first embodiment.

A front end of a swing arm 21 having a rear end at which a rear wheel WR, which is a driven member, is journaled, is swingably supported through a spindle 22 at a bracket 20 mounted on lower portions of the center frames 16. A rear cushion unit 23 is mounted between rear portions of the seat rails 18 and a rear portion of the swing arm 21.

A power unit PA is placed in an area surrounded by the main frame 14, the down frame 15, the center frames 16 and the lower frames 17. The power unit PA is supported by the down frame 15, the center frames 16, and the lower frames 17. A drive sprocket 26 is placed on the left side of the power unit PA and is secured to an output shaft 25 of the power unit PA. The drive sprocket 26, a driven sprocket 27 mounted on the rear wheel WR, and an endless chain 28 looped around the drive sprocket 26 and the driven sprocket 27 form a chain transmission mechanism 29.

A luggage box 30 is mounted on the main frame 14 in a location that it is above the power unit PA. An occupant seat 31 arranged rearward of the luggage box 30 is supported by the seat rails 18.

Figure 2:
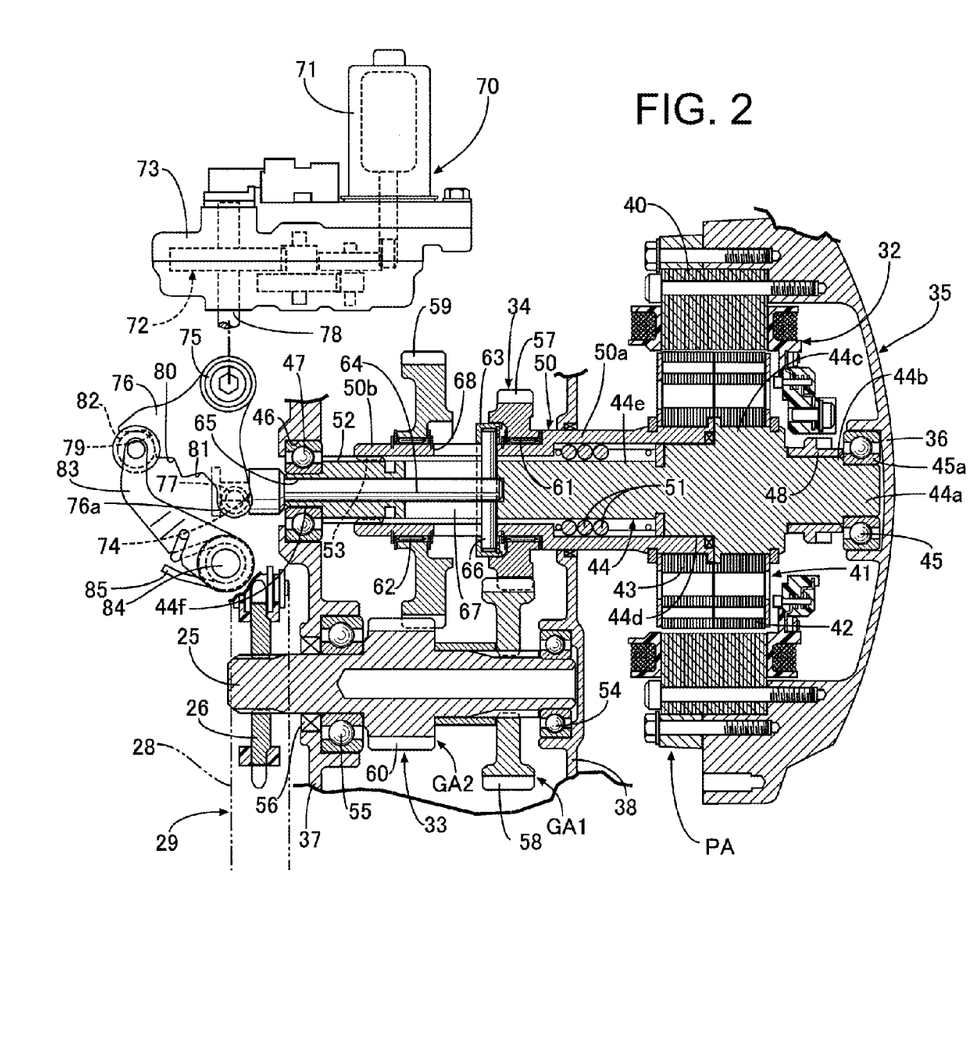
FIG. 2 is a vertical section view illustrating the structure of a power unit when a movable rotor of an electric motor is positioned closer to a fixed rotor to establish a first speed gear train.

In FIG. 2, the power unit PA includes an electric motor 32 having a rotation axis parallel to the rear wheel WR, and a gear shift mechanism 34 that together with the chain transmission mechanism 29 makes up a power transmission 33 interposed between the electric motor 32 and the rear wheel WR.

A case 35 of the power unit PA has a right sidewall 36 arranged on the right side in the vehicle-width direction, a left sidewall 37 arranged on the left side in the vehicle-width direction and a middle wall 38 arranged in a location midway between the right sidewall 36 and the left sidewall 37, and is supported by the vehicle-body frame F. The electric motor 32, including a stator 40 and a rotor 41 that is arranged at a predetermined spacing from the stator 40 and at least a part of which is capable of moving in the axis direction, is contained in the case 35 between the right sidewall 36 and the middle wall 38 such that the stator 40 formed in a ring shape is fixed to the right sidewall 36.

The rotor 41 of the electric motor 32 is arranged inward or outward in the radial direction of the stator 40. In the illustrated embodiment, the rotor 41 is arranged inward in the radial direction of the stator 40. In addition, the rotor 41 is made up of a fixed rotor 42 fixed in place along its rotational axis, and a movable rotor 43, which is able to move in the direction along the rotational axis so as to be allowed to move toward/away from the fixed rotor 42. The fixed rotor 42 is secured to the motor shaft 44, which has an axis parallel to the output shaft 25 and both ends rotatably supported by the case 35. The movable rotor 43 is slidably supported by the motor shaft 44.

One end of the motor shaft 44 passing rotatably through the middle wall 38 is rotatably supported by the right sidewall 36 via a first ball bearing 45. The other end of the motor shaft 44 is coaxially inserted into a through hole 46 formed in the left sidewall 37. A second ball bearing 47 is interposed between the inner periphery of the through hole 46 and the outer periphery of the other end of the motor shaft 44.

The motor shaft 44 has, in order from one end to the other end in the axis direction and as an integrated unit, a first shaft portion 44a rotatably supported by the right sidewall 36 via the first ball bearing 45, a second shaft portion 44b of a larger diameter than that of the first shaft portion 44a, a third shaft portion 44c of a further larger diameter than that of the second shaft portion 44b, a fourth shaft portion 44d of a smaller diameter than that of the third shaft portion 44c, a fifth shaft portion 44e that is smaller in diameter than the fourth shaft portion 44d and extends through the middle wall 38 to the left sidewall 37, and a sixth shaft portion 44f that is smaller in diameter than the fifth shaft portion 44e and is rotatably supported by the left sidewall 37 via a second ball bearing 47.

A cylindrical spacer 48 is interposed between an inner ring 45a of the first ball bearing 45 and the third shaft portion 44c and fitted over the second shaft portion 44b, and the fixed rotor 42 is fixed to the third shaft portion 44c.

The motor shaft 44 supports a stepped and cylindrically-shaped sleeve 50 so as to be incapable of relatively rotating but capable of sliding in the axis direction. The sleeve 50 has a larger-diameter tube portion 50a that is identical in outer diameter with the third shaft portion 44c and coaxially surrounds the fourth and fifth shaft portions 44d, 44e, and a smaller-diameter tube portion 50b that is of a smaller outer diameter than the larger-diameter tube portion 50a and coaxially surrounds the fifth shaft portion 44e. The movable motor 43, which is identical in size with the fixed rotor 42, is secured to the larger-diameter tube portion 50a of the sleeve 50.

A plurality of balls 51 are interposed for smooth movement in the axis direction of the sleeve 50 between the larger-diameter tube portion 50a of the sleeve 50 and the fifth shaft portion 44e of the motor shaft 44. Spline teeth 53 engaged in a spline groove 52 formed in a portion of the outer periphery of the fifth shaft portion 44e located near the left sidewall 37 protrude from a portion of the inner periphery of the smaller-diameter tube portion 50b of the sleeve 50 located near the left sidewall 37.

The middle wall 38 of the case 35 rotatably supports, via a third ball bearing 54, one end of the output shaft 25 that passes rotatably through the left sidewall 37. A fourth ball bearing 55 and a ring-shaped sealing member 56 placed outward of the fourth ball bearing 55 are interposed between the left sidewall 37 and the output shaft 25. The drive sprocket 26 forming a part of the chain transmission mechanism 29 is secured to the other end of the output shaft 25 outside the case 35.

The gear shift mechanism 34 forming a part of the power transmission 33 has first and second speed gear trains GA1, GA2, which are selectively established. The first speed gear train GA1 includes a first drive gear 57 that is relatively rotatably supported by the motor shaft 44, and a first driven gear 58 fixed to the output shaft 25 and meshing with the first drive gear 57 at all times. The second speed gear train GA2 includes a second drive gear 59 that is larger in diameter than the first drive gear 57 and relatively rotatably supported by the motor shaft 44, and a second driven gear 60, which is smaller in diameter than the first driven gear 58, formed integrally with the output shaft 25 and meshing with the second drive gear 59 at all times.

Each of the first and second drive gears 57, 59 is supported by the outer periphery of the smaller-diameter tube portion 50b of the sleeve 50 so as to be allowed to relatively rotate while keeping a fixed position relative to the sleeve 50 in the axis direction. A needle bearing 61 is interposed between the first drive gear 57 and the smaller-diameter tube portion 50b of the sleeve 50. A needle bearing 62 is interposed between the second drive gear 59 located on the opposite side of the first drive gear 57 from the movable rotor 43, and the smaller-diameter tube portion 50b of the sleeve 50. That is, the movable rotor 43, which is secured to the sleeve 50 supported by the motor shaft 44 so as to be incapable of relatively rotating and capable of sliding in the axis direction, is disposed between the power transmission 33 and the fixed rotor 42 and slidably supported by the motor shaft 44.

The gear shift mechanism 34 has a dog 63 used for moving the motor shaft 44 in the axis direction to perform the switching between engagement and disengagement on the first and second drive gears 57, 59 in order to selectively establish the first and the second speed gear trains GA1, GA2. The dog 63 is slidably fitted over the outer periphery of the smaller-diameter tube portion 50b of the sleeve 50 between the first and second drive gears 57, 59.

The dog 63 is driven in the axis direction of the motor shaft 44 by a drive member 64. The drive member 64 is coupled to a movable part of the rotor 41, namely, the movable rotor 43. In this connection, at least a part of the motor shaft 44 is hollowed out to have a coaxial sliding hole 65. In the first embodiment, the sliding hole 65 having a bottom and opening on the other end of the motor shaft 44 is coaxially formed in the fifth and sixth shaft portions 44e, 44f of the motor shaft 44, and the drive member 64 formed in a bar shape is slidably fitted into the sliding hole 65.

A dog operating element 66 coupled to the dog 63 is coupled to the inner end of the drive member 64. The dog operating element 66, which is a pin extending in a direction perpendicular to the axis of the drive member 64, extends both outwards in the radial direction from the drive member 64, and both the ends of the dog operating element 66 are coupled to the dog 63.

On the other hand, the fifth shaft portion 44e of the motor shaft 44 has a first long hole 67 extending in the axis direction to allow the dog operating element 66 to be inserted into the first long hole 67. The smaller-diameter tube portion 50b of the sleeve 50 has a second long hole 68 extending in the axis direction to allow the dog operating element 66 to be inserted into the second long hole 68.

The second long hole 68 has a length permitting the dog operating element 66 to move relative to the sleeve 50 in the axis direction so that the dog 63 is selectively engaged with the first or the second drive gear 57, 59. The first long hole 67 has a length permitting the movement of the dog operating element 66 when the dog 63 is selectively engaged with the first or the second drive gear 57, 59, and permitting the dog operating element 66 to move in the direction of moving the dog 63 engaged with the second drive gear 59 away from the fixed rotor 42.

Specifically, when the dog operating element 66 is at one end of the first and second long holes 67, 68 in the longitudinal direction, as shown in FIG. 2, the dog 63 is engaged with the first drive gear 57, thus establishing the first speed gear train GA1. In this condition, the movable rotor 43 is in the initial state in which the movable rotor 43 approaches closest to the fixed rotor 42.

Figure 3:
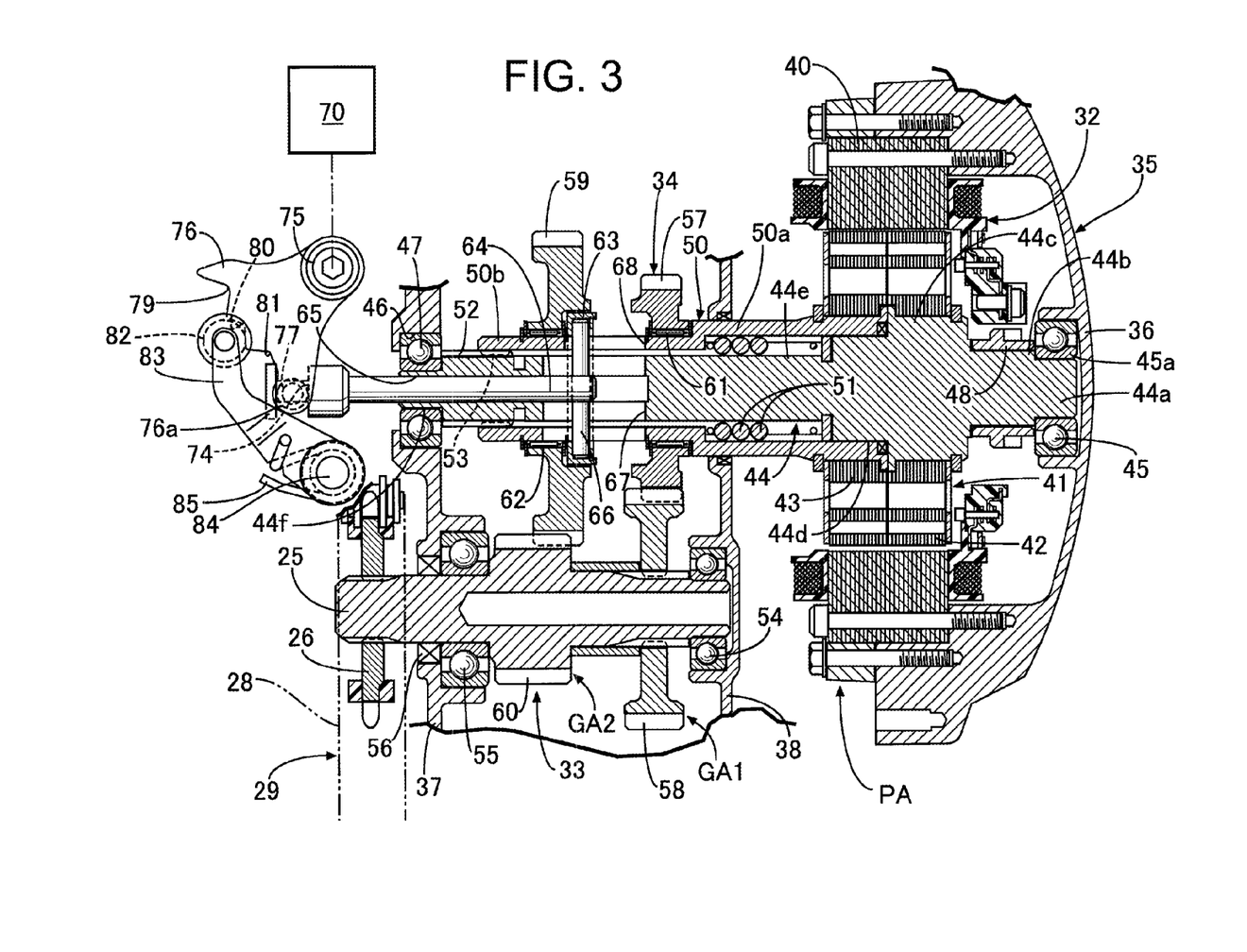
FIG. 3 is a vertical section view illustrating the structure of the power unit when the movable rotor of the electric motor is moved toward the fixed rotor to establish a second speed gear train.

Next, when the dog operating element 66 is at the other end of the second long hole 68 in the longitudinal direction and also in a middle portion of the first long hole 67 in the longitudinal direction, as shown in FIG. 3, the dog 63 is engaged with the second drive gear 59, thus establishing the second speed gear train GA2. In this condition, the movable rotor 43 remains in the initial state.

Further, upon movement of the dog operating element 66 to be positioned at the other end of the first long hole 67 in the longitudinal direction, the dog operating element 66 abuts on and engages with the other end edge of the second long hole 68 in the longitudinal direction, so that while the second speed gear train GA2 is established, the sleeve 50 is slid in the axis direction of the motor shaft 44, resulting in separation of the movable rotor 43 from the fixed rotor 42.

That is, the movement of the drive member 64 in the axis direction makes a switch between the state in which the first speed gear train GA1 is established while the output characteristics of the electric motor 32 show high torque at low rotation, the state in which the second speed gear train GA2 is established while the output characteristics of the electric motor 32 show high torque at low rotation, and the state in which the second speed gear train GA2 is established while the output characteristics of the electric motor 32 show low torque at high rotation.

The fixed rotor 42 and the movable rotor 43, which are identical in size, are formed such that, in the initial state in which the movable rotor 43 approaches closest to the fixed rotor 42, as shown in FIG. 2 and FIG. 3, the rotor 41 made up of the fixed rotor 42 and the movable rotor 43 is located within a width range along the axis of the stator 40.

Figure 4:
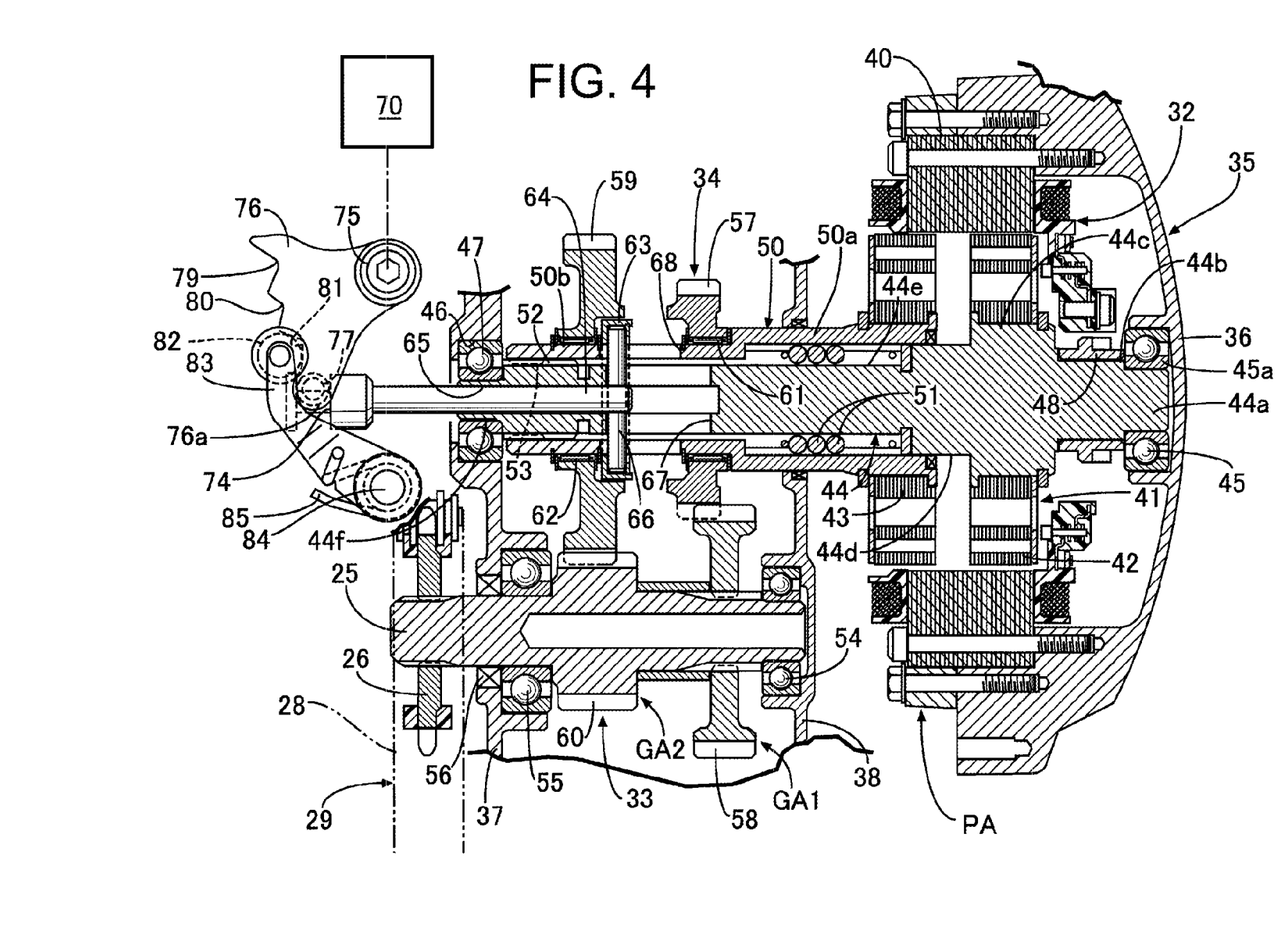
FIG. 4 is a vertical section view illustrating the structure of the power unit when the movable rotor of the electric motor is moved away from the fixed rotor to establish the second speed gear train.

In the state in which the movable rotor 43 is located farthest from the fixed rotor 42, a part of the movable rotor 43 overlaps the stator 40 when viewed from a direction perpendicular to the central axis of the stator 40 as shown in FIG. 4. The moving range of the movable rotor 43 is set to the range of the movable rotor 43 overlapping a part of the stator 40 when viewed from a direction perpendicular to the central axis of the stator 40.

Now the drive member 64 is coupled to an actuator 70 providing power driving the drive member 64 in the axis direction of the motor shaft 44. The actuator 70 includes an electric motor 71 and a gear reduction mechanism 72 that reduces the speed of output of the electric motor 71 for transmission. The electric motor 71 is mounted on a gear case 73 containing the gear reduction mechanism 72.

The actuator 70 is arranged above the power transmission 33, and specifically, in the first embodiment, on top of the case 35 of the power unit PA.

A ring-shaped groove 74 is formed in the outer end of the drive member 64. An embrace portion 76a is formed in a rotating member 76, which is formed in a fan shape and has a pivot of the fan secured to a rotating shaft 75, and straddles the outer end of the drive member 64 rotating together with the motor shaft 44. A roller 77 fitted into the ring-shaped groove 74 is journaled to the embrace portion 76a. A drive shaft 78, which is an output end of the gear reduction mechanism 72, is coupled to and in synchronization with the rotating shaft 75. Specifically, the rotating member 76 is rotated by the actuator 70, and therefore, the drive member 64 embraced by the rotating member 76 is driven in the axis direction of the motor shaft 44.

Recesses 79, 80, 81 are formed in three portions on the outer periphery of the rotating member 76 at intervals in the peripheral direction. An arm 83 has one end to which a roller 82 allowed to engage with the recesses 79 to 81 is journaled and the other end is rotatably supported through a shaft 84 by the case 35. A spring 85 is provided between the case 35 and the arm 83 to force the arm 83 in a direction of pressing the roller 82 against the outer periphery of the rotating member 76.

The three recesses 79 to 81 in the outer periphery of the rotating member 76 are arranged such that the roller 82 can be engaged when the dog operating element 66 is at the one end of the first and second long holes 67, 68 in the longitudinal direction (in the state shown in FIG. 2), when the dog operating element 66 is at the other end of the second long hole 68 in the longitudinal direction and also in the middle portion of the first long hole 67 in the longitudinal direction (in the state shown in FIG. 3), and when the dog operating element 66 is at the other end of the first long hole 67 in the longitudinal direction (in the state shown in FIG. 4), and the state is stably maintained by engaging the roller 82 with each recess 79, 80, 81.

The rotating member 76 and the arm 83 are accommodated within a cover 86 (see FIG. 1), which is attached to the left sidewall 37 of the case 35 such that the left sidewall 37 is covered from outside.

Figure 5:
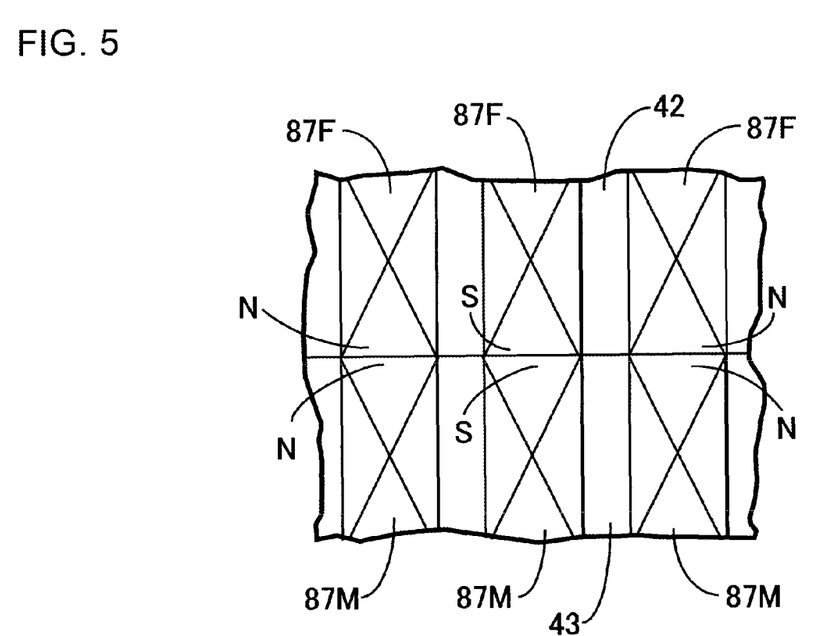
FIG. 5 is a diagram illustrating a relative arrangement of magnets of the fixed rotor and the movable rotor.

As shown in FIG. 5, now, the fixed rotor 42 and the movable rotor 43 are provided respectively with a plurality of magnets 87F, 87M that are arranged at equal and regular intervals in the peripheral direction of their rotor 41. The phase between the magnets 87F, 87M of the fixed rotor 42 and the movable rotor 43 is determined such that each of the magnets 87F in the fixed rotor 42 and the corresponding magnet 87M in the movable rotor 43 facing the magnet 87F have the same polarity in the face-to-face area of the fixed rotor 42 and the movable rotor 43.

Referring again to FIG. 1, a control unit 88, which controls the operation of the electric motor 32 included in the power unit PA is placed forward of the power unit PA such that the control unit 88 is supported by the down frame 15. A battery unit 89 for supplying electric power to the electric motor 32 is placed in the area surrounded with the center frames 16, the seat rails 18 and the rear frames 19 such that the battery unit 89 is supported by the center frames 16, the seat rails 18 and the rear frames 19.

Next, operation of the first embodiment will be described. The electric motor 32, which is designed to allow at least a part of the rotor 41 arranged at a predetermined spacing from the stator 40 to move in the axis direction, is mounted on the vehicle-body frame F. The gear shift mechanism 34 forming a part of the power transmission 33 interposed between the motor shaft 44 of the electric motor 32 and the rear wheel WR includes the first and second speed gear trains GA1, GA2, which have respectively the first and second drive gears 57, 59 relatively rotatably supported by the motor shaft 44, and the dog 63, which is moved in the axis direction of the motor shaft 44 to perform the switching between engagement and disengagement on the first and second drive gears 57, 59 so that the first and second speed gear trains GA1, GA2 can be selectively established. The drive member 64 for driving the dog 63 in the axis direction of the motor shaft 44 is coupled to the movable part of the rotor 41. Accordingly, by operating the drive member 64, the first and the second speed gear trains GA1, GA2 can be selectively established for a change in speed, and also the movable part of the rotor 41 can be moved to change the output characteristics of the electric motor 32. Placement of the gear shift mechanism 34 between the electric motor 32 capable of changing the output characteristics and the rear wheel WR can achieve a further improvement in running performance and also a structure of an effective operating mechanism for changing the running performance.

Because at least a part of the motor shaft 44 is hollowed out to have the coaxial sliding hole 65, and the drive member 64 formed in a bar shape is slidably fitted into the sliding hole 65, it is possible to reduce the space for installing the drive member 64 provided in an area except the motor shaft 44, and place compactly and collectively the motor shaft 44 and the drive member 64.

Also, the rotor 41 is made up of the fixed rotor 42, which is fixed in place along its rotational axis, and the movable rotor 43, which serves as a movable part capable of moving in the direction along the rotational axis so as to be allowed to move toward/away from the fixed rotor 42, and is placed in an inner area in the radius direction of the stator 40. Because of this, even when the movable rotor 43 moves, the spacing between the rotor 41 and the stator 40 is not changed, so that predetermined performance can be offered by accuracy control in assembly. In addition, the movement of the movable rotor 43 effects a change of the amount of magnetic flux, so that the switching between a low-rotation, high-torque motor and a high-rotation, low-torque motor is possible, providing pronounced performances of the low-rotation, high-torque motor and the high-rotation, low-torque motor. Furthermore, the division of the rotor 41 in the axis direction offers a higher permeance coefficient, achieving an improvement in demagnetization toughness during operation at high temperature.

The movable rotor 43 is secured to the cylinder-shaped sleeve 50 supported to be incapable of rotating relative to the motor shaft 44 and capable of sliding in the axis direction. The first drive gear 57 located closer to the movable rotor 43 and the second drive gear 59 located on the opposite side of the first drive gear 57 from the movable rotor 43 are relatively rotatably supported to be in a constant relative position in the axis direction. The dog operating element 66 coupled to the drive member 64 extends outward from the drive member 64 in the radius direction. The first long hole 67 is formed in the motor shaft 44 and extends in the axis direction of the motor shaft 44 so that the dog operating element 66 is inserted into the first long hole 67. The second long hole 68 is formed in the sleeve 50 and extends in the axis direction of the sleeve 50 so that the dog operating element 66 is inserted into the second long hole 68. The second long hole 68 has a length permitting the dog operating element 66 to move relative to the sleeve 50 in the axis direction so that the dog 63 engages selectively with the first or the second drive gear 57, 59. The first long hole 67 has a length permitting the dog operating element 66 to move when the dog 63 engages selectively with the first or the second drive gear 57, 59 and permitting the dog operating element 66 to move in the direction of moving the dog 63 engaged with the second drive gear 59 away from the fixed rotor 42.

Accordingly, it is possible to switch among the state in which the dog operating element 66 coupled to the drive member 64 is at one end of the second long hole 68 in the longitudinal direction and the dog 63 is engaged with the first drive gear 57 in order that the first speed gear train GA1 is established and the movable rotor 43 approaches closest to the fixed rotor 42, the state in which the dog operating element 66 is at the other end of the second long hole 68 in the longitudinal direction and in a middle portion of the first long hole 67 in the longitudinal direction and the dog 63 is engaged with the second drive gear 59 in order that the second speed gear train GA2 is established and the movable rotor 43 approaches closest to the fixed rotor 42, and the state in which, by moving the dog operating element 66 to be positioned at the other end of the first long hole 67 in the longitudinal direction, the dog operating element 66 abuts on and engages with the other end edge of the second long hole 68 in the longitudinal direction, so that while the second speed gear train GA2 remains established, the movable rotor 43 is moved away from the fixed rotor 42. Only simple operation of the drive member 64 in the axis direction makes it possible to perform the switching of output characteristics of the electric motor 32 and the gear-change switching in the power transmission.

Since the actuator 70 providing power for driving the drive member 64 is connected to the drive member 64, the operability in the switching of output characteristics of the electric motor 32 and the gear-change switching in the power transmission 33 can be improved. In addition, the actuator 70 can be efficiently arranged in an electric vehicle so as to be located above the power transmission 33.

A plurality of magnets 87F and a plurality of magnets 87M are arranged respectively in the fixed rotor 42 and the movable rotor 43 at equal and regular intervals in the peripheral direction of the rotor 41. The phase between the magnets 87F, 87M of the fixed rotor 42 and the movable rotor 43 is determined such that each of the magnets 87F in the fixed rotor 42 and the corresponding magnet 87M in the movable rotor 43 facing the magnet 87F have the same polarity in the face-to-face area of the fixed rotor 42 and the movable rotor 43. As a result, a repulsive force is generated between the fixed rotor 42 and the movable rotor 43, thus facilitating separation of the movable rotor 43 from the fixed rotor 42.

Since the fixed rotor 42 and the movable rotor 43 are formed in the same size, the magnets 87F, 87M provided in the fixed rotor 42 and the movable rotor 43 are identical to each other, thus achieving commonality. Since the rotor 41 is located within the width along the axis of the stator 40 in the initial state in which the movable rotor 43 approaches closest to the fixed rotor 42, the rotor 41 in the initial state is in the same environment as a conventional rotor which is not split, and therefore is allowed to offer full performance.

Since the moving range of the movable rotor 43 is set to the range of the movable rotor 43 overlapping a part of the stator 40 when viewed from a direction perpendicular to the central axis of the stator 40, the performance of the electric motor 32 can be varied while the distance of the movable rotor 43 is minimized, resulting in a compact structure of the electric motor 32.

Because the movable rotor 43, which is arranged between the fixed rotor 42 and the power transmission 33 transmitting rotational power of the motor shaft 44 to which the fixed rotor 42 is fixed to the rear wheel WR, is slidably supported by the motor shaft 44, this makes it possible to place the movable rotor 43 between the fixed rotor 42 and the power transmission 33 with space efficiency.

Figure 6:
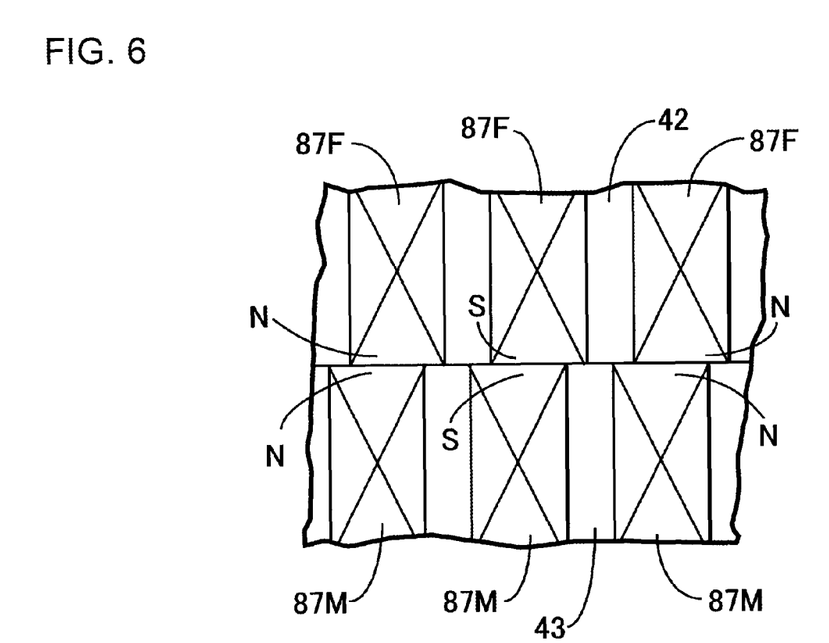
FIG. 6 is a diagram illustrating a relative arrangement of magnets of a fixed rotor and a movable rotor in a second embodiment.
Figure 7:
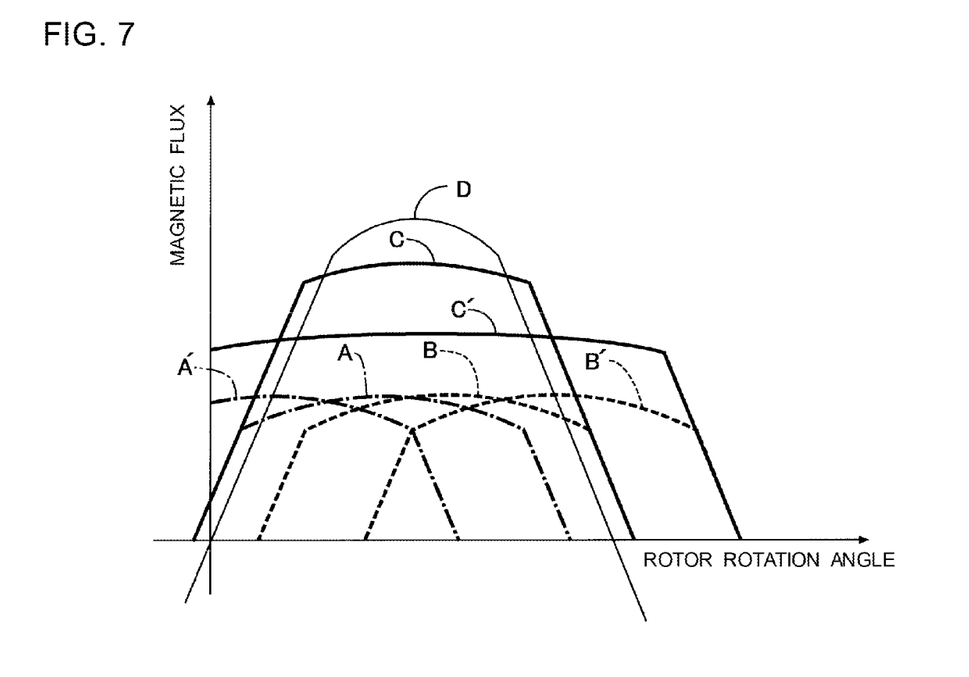
FIG. 7 is a graph showing a flux change caused by out-of-phase between magnets.

As a second embodiment of the present invention, as illustrated in FIG. 6, the magnets 87F of the fixed rotor 42 and the magnets 87M of the movable rotor 43 may be arranged out of phase such that the same poles partially face each other. By doing so, it is possible to reduce the cogging torque produced when external forces are used to rotate the rotor 41 in non-energized conditions, that is, the cogging torque produced when the rider walks while pushing his/her motorcycle. Specifically, as shown in FIG. 7, curve D shows the amount of magnetic flux in a typical electric motor with a rotor 41 not divided in the axis direction in non-energized conditions. On the other hand, curves A, B show the amount of magnetic flux caused by the fixed rotor 42 and the movable rotor 43 with the magnets 87F, 87M being out of phase. The amount of magnetic flux generated in the electric motor 32 including the rotor 41 made up of the fixed rotor 42 and the movable rotor 43 with the magnets 87F, 87M being out of phase exhibits curve C resulting from an addition of curves A, B to each other, in which the cogging torque is lower than a typical electric motor.

Figure 8:
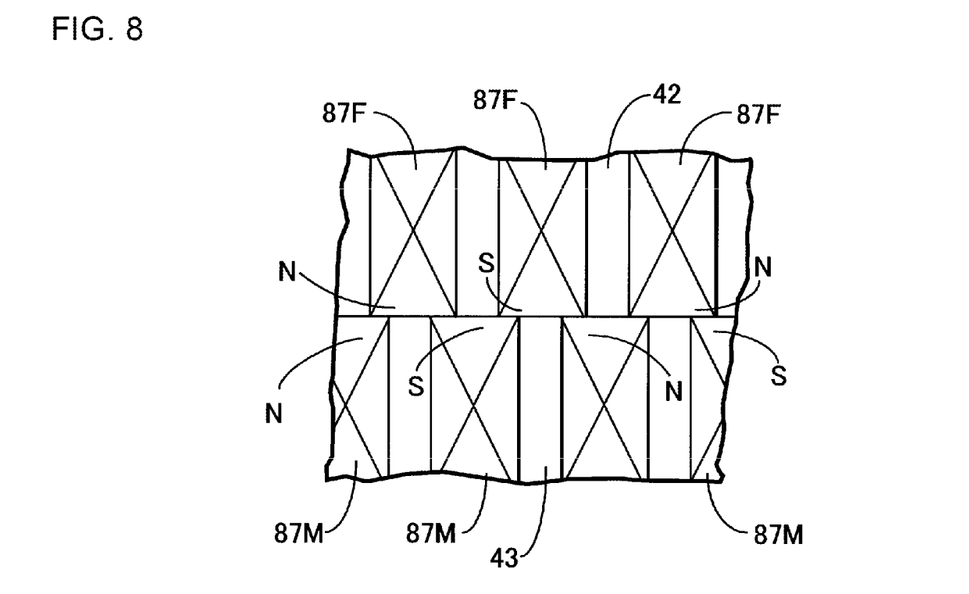
FIG. 8 is a diagram illustrating a relative arrangement of magnets of a fixed rotor and a movable rotor in a third embodiment.

As a third embodiment of the present invention, as shown in FIG. 8, in the face-to-face area of the fixed rotor 42 and the movable rotor 43, the magnets 87F, 87M in the fixed rotor 42 and the movable rotor 43 may be arranged out of phase with each other such that a part of one of the N and S poles of the magnets 87F of the fixed rotor 42 faces the other pole of the N and S poles of the magnets 87M of the movable rotor 43. By doing so, as shown in FIG. 7, curve D shows the amount of magnetic flux in a typical electric motor with a rotor 41 not divided in the axis direction in non-energized conditions. On the other hand, curves A', B' show the amount of magnetic flux caused by the fixed rotor 42 and the movable rotor 43 with the magnets 87F, 87M being out of phase. The amount of magnetic flux generated in the electric motor 32 including the rotor 41 made up of the fixed rotor 42 and the movable rotor 43 with the magnets 87F, 87M being out of phase exhibits curve C' resulting from an addition of curves A', B' to each other, in which the cogging torque is lower than a typical electric motor. In addition, a reduction in magnetic flux makes it possible to implement performance of like a high-rotation, low-torque motor.

As an modification example of the first to third embodiments, the movable rotor 43 may have a length along its axis shorter than the length along the axis of the fixed rotor 42, and the fixed rotor 42 and the movable rotor 43 may be formed such that the rotor 41 made up of the fixed rotor 42 and the movable rotor 43 may be arranged within the width along the axis of the stator 40 in the initial state in which the movable rotor 43 approaches closest to the fixed rotor 42. Thus, performance of a low-rotation, high-torque motor and a high-rotation, low-torque motor can be easily offered, and also the movable rotor 43 can be designed to be affected by a repulsive force in order to reduce the force required to move the movable rotor 43.

Figure 9:
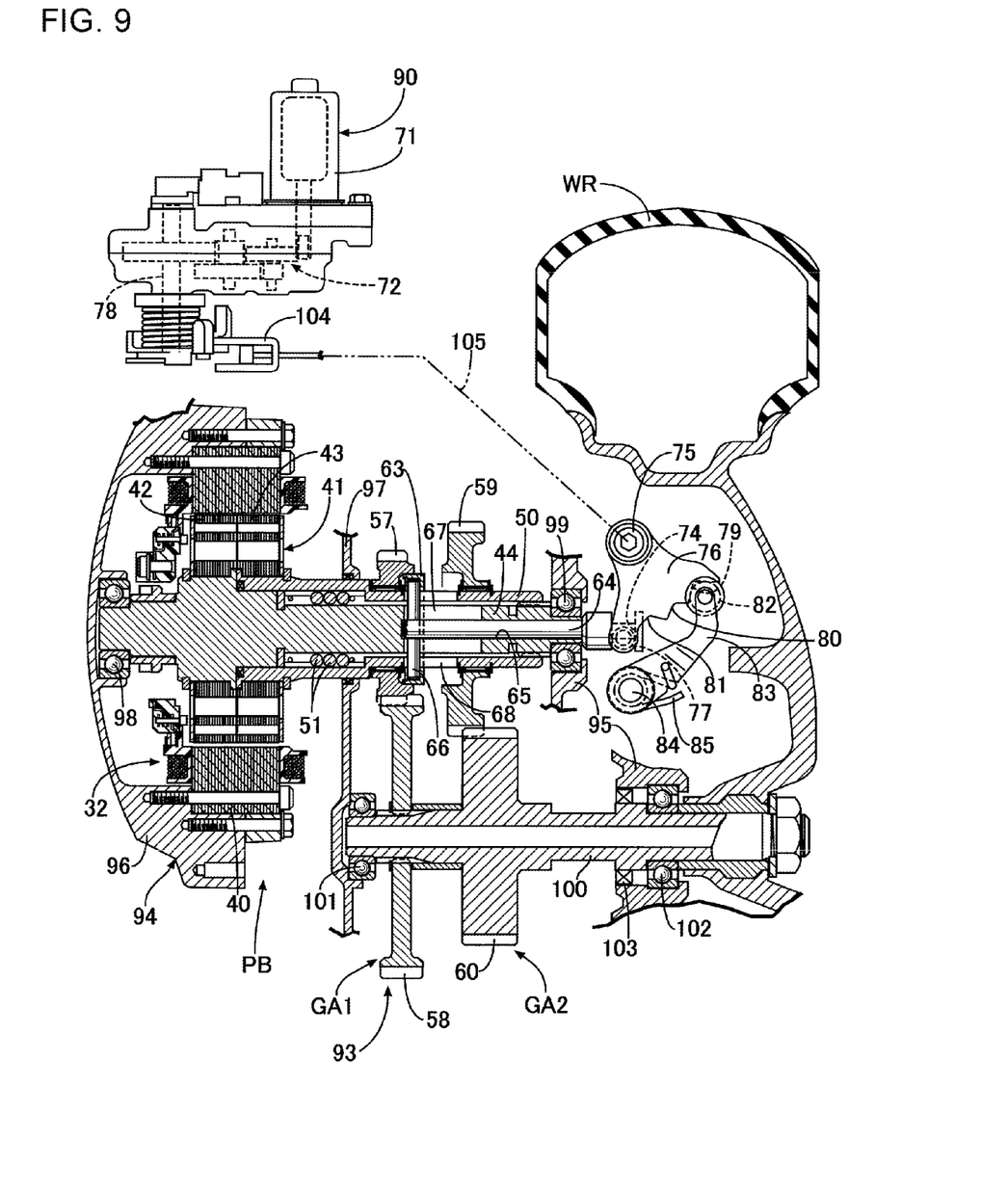
FIG. 9 is a vertical section view of a power unit in a fourth embodiment.

A fourth embodiment of the present invention will be described with reference to FIG. 9, in which components corresponding to the first embodiment in FIG. 1 to FIG. 5 are designated by the same reference signs only for illustration and a detailed description is omitted.

A power unit PB has an electric motor 32 having a rotation axis parallel to a rear wheel WR, and a power transmission 93 interposed between the electric motor 32 and the rear wheel WR, and is located on the left side of the rear wheel WR.

A case 94 of the power unit PB has a right sidewall 95 arranged on the left side of the rear wheel WR and on the right side in the vehicle-width direction, a left sidewall 96 arranged on the left side in the vehicle-width direction, and a middle wall 97 arranged in a middle area between the right sidewall 95 and the left sidewall 96, and is stationarily arranged. The electric motor 32 having a rotation axis parallel to the rotation axis of the rear wheel WR is accommodated in the case 94 between the left sidewall 96 and the middle wall 97 such that the stator 40 is fixed to the left sidewall 96.

A motor shaft 44 of the electric motor 32 is arranged to rotatably pass through the middle wall 97. The left end of the motor shaft 44 is rotatably supported by the left sidewall 96 via a ball bearing 98. The right end of the motor shaft 44 is rotatably supported by the right sidewall 95 via a ball bearing 99.

The motor shaft 44 supports a sleeve 50 rotatably and hermetically passing through the middle wall 97 so as to be incapable of relatively rotating but capable of sliding in the axis direction. The movable rotor 43 of the electric motor 32 is secured to the sleeve 50.

An axle 100 of the rear wheel WR rotatably passes through the right sidewall 95 of the case 94 to protrude into the case 94. A ball bearing 101 is interposed between the inner end of the axle 100 and the middle wall 97. A ball bearing 102 and a ring-shaped sealing member 103 arranged inward of the ball bearing 102 are interposed between the axle 100 and the right sidewall 95.

The power transmission 93 is structured as a gear shift mechanism having basically the same structure as the gear shift mechanism 34 in the first embodiment, which includes a first speed gear train GA1 including a first drive gear 57 relatively rotatably supported by the motor shaft 44 and a first driven gear 58 secured to the axle 100 and meshing with the first drive gear 57, and a second speed gear train GA2 including a second drive gear 59 having a larger diameter than the first drive gear 57 and relatively rotatably supported by the motor shaft 44 and a second driven gear 60 having a smaller diameter than the first driven gear 58, formed integrally with the axle 100 and meshing with the second drive gear 59, in which the first and second speed gear trains GA1, GA2 are able to be selectively established.

A dog 63 for performing the switching between engagement and disengagement on the first and second drive gears 57, 59 to selectively establish the first or the second speed gear train GA1, GA2 is coupled through a dog operating element 66 to a drive member 64 that is slidably fitted into a sliding hole 65 formed in the motor shaft 44 to have a bottom and open on the right end of the motor shaft 44. The motor shaft 44 has a first long hole 67 formed therein to allow the dog operating element 66 to be inserted therein. The sleeve 50 has a second long hole 68 formed therein to allow the dog operating element 66 to be inserted therein.

Thus, as in the case of the first embodiment, a movement of the drive member 64 in the axis direction can switch among the state in which the first speed gear train GA1 is established during the initial state in which the movable rotor 43 is made to approach closest to the fixed rotor 42 in the electric motor 32, the state in which the second speed gear train GA2 is established during the initial state in which the movable rotor 43 is made to approach closest to the fixed rotor 42 in the electric motor 32, and the state in which the movable rotor 43 is moved away from the fixed rotor 42 while the second speed gear train GA2 remains established.

A roller 77 journaled to a rotating member 76 is engaged with a ring-shaped groove 74, which is formed in the end of the drive member 64 protruding from the case 94 toward the rear wheel WR. The rotating member 76 is secured to a rotating shaft 75 and arranged between the case 94 and the rear wheel WR. An arm 83 is also arranged between the case 94 and the rear wheel WR and has a roller 82 selectively engaged with recesses 79 to 81 formed in the rotating member 76.

A drum 104 is provided on a drive shaft 78 of an actuator 70. A cable 105 having one end wound on and coupled to the drum 104 is coupled to and in synchronization with the rotating shaft 75 so as to rotate the rotating member 76 in response to a rotational movement of the drum 104.

In the fourth embodiment the same advantageous effects as those in the first embodiment can be offered.

Figure 10:
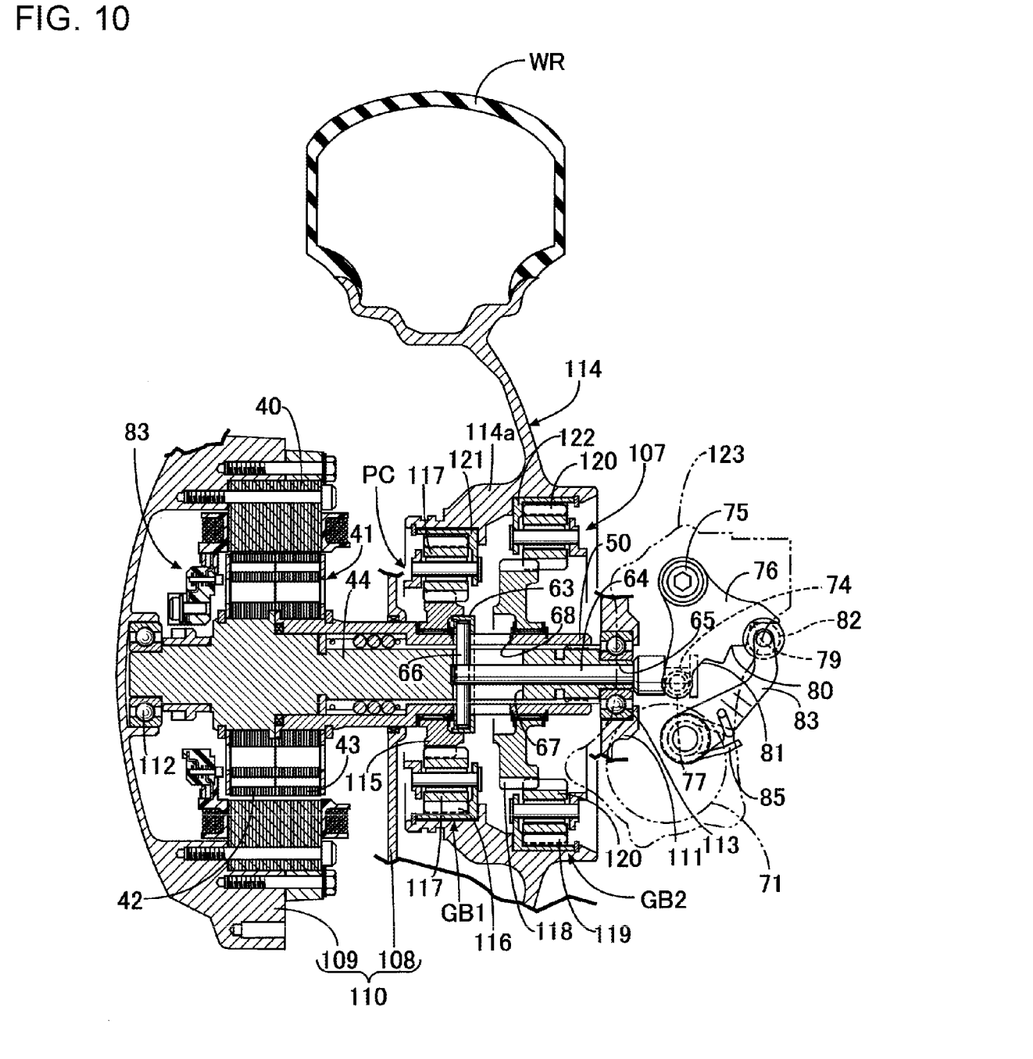
FIG. 10 is a vertical section view of a power unit in a fifth embodiment.

A fifth embodiment of the present invention will be described with reference to FIG. 10, in which components corresponding to the first to fourth embodiments are designated by the same reference signs.

A power unit PC includes an electric motor 32 having a rotational axis located coaxially with the rear wheel WR and a power transmission 107 interposed between the electric motor 32 and the rear wheel WR.

The electric motor 32 is arranged on the left side of the rear wheel WR, and accommodated in a case 110 including a right sidewall 108 arranged on the left side of the rear wheel WR and on the right side in the vehicle-width direction and a left sidewall 109 arranged on the left side in the vehicle-width direction such that a stator 40 is secured to the left sidewall 109. A swing arm 111 is arranged on the right side of the rear wheel WR. The case 110 and the swing arm 111 are supported by a vehicle-body frame (not shown) to be allowed to swing.

A motor shaft 44 of the electric motor 32 is arranged to pass rotatably through the right sidewall 108. The left end of the motor shaft 44 is rotatably supported by the left sidewall 109 via a ball bearing 112, while the right end of the motor shaft 44 is rotatably supported by the swing arm 111 via a ball bearing 113.

The motor shaft 44 supports a sleeve 50 rotatably and hermetically passing through the right sidewall 108 so as to be incapable of relatively rotating but capable of sliding in the axis direction, and the movable rotor 43 of the electric motor 32 is secured to the sleeve 50.

The power transmission 107 has first and second speed gear trains GB1, GB2 interposed between the sleeve 50 and a hub 114a of a wheel 114 of the rear wheel WR, and is capable of selectively establishing the first and second speed gear trains GB1, GB2.

The first speed gear train GB1 has a first sun gear 115, which is a first drive gear, relatively rotatably supported by the motor shaft 44, a first ring gear 116 fixedly installed on the inner periphery of the hub 114a, and a plurality of first planet gears 117 meshing with the first sun gear 115 and the first ring gear 116, and is configured as a planetary gear mechanism. The second speed gear train GB2 has a second sun gear 118, which is a second drive gear, relatively rotatably supported by the motor shaft 44, a second ring gear 119 fixedly installed on the inner periphery of the hub 114a, and a plurality of second planet gears 120 meshing with the second sun gear 118 and the second ring gear 119, and is configured as a planetary gear mechanism.

The first sun gear 115 has a smaller diameter than that of the second sun gear 118. The first and second planet gears 117, 120 are identical in diameter. The first ring gear 116 has a smaller diameter than that of the second ring gear 119. A planet carrier 121 to which the first planet gears 117 are journaled and a planet carrier 122 to which the second planet gears 120 are journaled are fixedly installed to the hub 114a.

A dog 63 for performing the switching between engagement and disengagement on the first and second sun gears 115, 118 is coupled through a dog operating element 66 to a drive member 64, which is slidably fitted into a sliding hole 65 formed in the motor shaft 44 to have a bottom and open in the right end of the motor shaft 44. A first long hole 67 is formed in the motor shaft 44 for allowing the dog operating element 66 to be inserted therein. A second long hole 68 is formed in the sleeve 50 for allowing the dog operating element 66 to be inserted therein.

And, as in the case with the first and second embodiments, a movement of the drive member 64 in the axis direction makes a switch among the state in which the first speed gear train GB1 is established during the initial state in which the movable rotor 43 approaches closest to the fixed rotor 42 in the electric motor 32, the state in which the second speed gear train GB2 is established during the initial state in which the movable rotor 43 approaches closest to the fixed rotor 42 in the electric motor 32, and the state in which the movable rotor 43 is moved away from the fixed rotor 42 while the second speed gear train GB2 remains established.

A roller 77 journaled to a rotating member 76 is engaged with a ring-shaped groove 74, which is formed in the end of the drive member 64 protruding from the swing arm 111 on the right side of the rear wheel WR. A roller 82 of an arm 83 is selectively engaged with recesses 79 to 81 formed in the rotating member 76. Further, the rotating member 76 and the arm 83 are arranged on the right side of the swing arm 111 so as to be supported by the swing arm 111.

The swing arm 111 supports an actuator 123 having an electric motor 71. An output end of the actuator 123 is coupled directly to a rotating shaft 75 to which the rotating member 76 is secured.

According to the fifth embodiment, a collective and compact structure in which the power unit PC is placed near the rear wheel WR is made possible in addition to the same advantageous effects as the first to fourth embodiments.

Thus, some embodiments of the present invention have been described, but the present invention is not limited to the aforementioned embodiments. A variety of changes in design without departing from the invention as defined in the appended claims.

For example, each embodiment has described the electric motor 32 with the rotor 41 arranged inside of the stator 40 in the radius direction, but the present invention can be applied to an electric motor with a rotor placed outside of a stator in the radius direction.

REFERENCE SIGN LIST

32 . . . Electric motor
40 . . . Stator
41 . . . Rotor
42 . . . Fixed rotor
43 . . . Movable rotor
44 . . . Motor shaft
87F, 87M . . . Magnets
WR . . . Rear wheel which is driven member

What is claimed is:

1. An electric motor comprising:
a stator; and
a rotor arranged at a predetermined spacing from the stator,
wherein the rotor arranged inside or outside of the stator in
  a radius direction includes:
  a fixed rotor fixed in a position along a rotation axis of
    the rotor; and
  a movable rotor allowed to approach/separate from the
    fixed rotor and to move in a direction along the rotation axis,
wherein the fixed rotor is secured to a motor shaft and the
  movable rotor is slidably supported by the motor shaft,
  the movable rotor being arranged between the fixed rotor
  and a power transmission for transmitting rotational
  power of the motor shaft to a driven member,
wherein a drive member is slidably fitted into a hole of the
  motor shaft and is coupled to the movable rotor, movement of the drive member along the rotation axis moving
  the movable rotor relative to the fixed rotor.

2. The electric motor according to claim 1, wherein:
a plurality of magnets is provided in each of the fixed rotor
  and the movable rotor and arranged at equal and regular
  intervals in a peripheral direction of the rotor; and
a phase of each of the magnets of the fixed rotor and the
  movable rotor is defined such that the magnet of the fixed
  rotor and the magnet of the movable rotor facing the
  magnet have the same polarity in a face-to-face area of
  the fixed rotor and the movable rotor.

3. The electric motor according to claim 2, wherein:
the fixed rotor and the movable rotor are identical in size
  with each other; and
the fixed rotor and the movable rotor are formed to allow
  the rotor made up of the fixed rotor and the movable rotor
  to be arranged within a width along an axis of the stator
  in an initial state in which the movable rotor approaches
  closest to the fixed rotor.

4. The electric motor according to claim 2, wherein:
the movable rotor is formed to have a shorter length along
  an axis of the movable rotor than a length along an axis
  of the fixed rotor; and
the fixed rotor and the movable rotor are formed to allow
  the rotor made up of the fixed rotor and the movable rotor
  to be arranged within a width along the axis of the stator
  in an initial state in which the movable rotor approaches
  closest to the fixed rotor.

5. The electric motor according to claim 2, wherein a moving range of the movable rotor is set to a range in which the movable rotor overlaps a part of the stator when viewed from a direction perpendicular to a central axis of the stator.

6. The electric motor according to claim 1, wherein:
a plurality of magnets is provided in each of the fixed rotor and the movable rotor and arranged at equal and regular intervals in a peripheral direction of the rotor; and
the magnets of the fixed rotor and the movable rotor are set out of phase such that the magnet of the fixed rotor and the magnet of the movable rotor partially face each other in a face-to-face area of the fixed rotor and the movable rotor.

7. The electric motor according to claim 6, wherein the magnets of the fixed rotor and the movable rotor are arranged out of phase such that a part of one of a north pole and a south pole of the magnets of the fixed rotor faces the other of a north pole and a south pole of the magnet of the movable rotor in the face-to-face area of the fixed rotor and the movable rotor.

8. The electric motor according to claim 7, wherein:
the fixed rotor and the movable rotor are identical in size with each other; and
the fixed rotor and the movable rotor are formed to allow the rotor made up of the fixed rotor and the movable rotor to be arranged within a width along an axis of the stator in an initial state in which the movable rotor approaches closest to the fixed rotor.

9. The electric motor according to claim 7, wherein:
the movable rotor is formed to have a shorter length along an axis of the movable rotor than a length along an axis of the fixed rotor; and
the fixed rotor and the movable rotor are formed to allow the rotor made up of the fixed rotor and the movable rotor to be arranged within a width along the axis of the stator in an initial state in which the movable rotor approaches closest to the fixed rotor.

10. The electric motor according to claim 7, wherein a moving range of the movable rotor is set to a range in which the movable rotor overlaps a part of the stator when viewed from a direction perpendicular to a central axis of the stator.

11. The electric motor according to claim 6, wherein:
the fixed rotor and the movable rotor are identical in size with each other; and
the fixed rotor and the movable rotor are formed to allow the rotor made up of the fixed rotor and the movable rotor to be arranged within a width along an axis of the stator in an initial state in which the movable rotor approaches closest to the fixed rotor.

12. The electric motor according to claim 6, wherein:
the movable rotor is formed to have a shorter length along an axis of the movable rotor than a length along an axis of the fixed rotor; and
the fixed rotor and the movable rotor are formed to allow the rotor made up of the fixed rotor and the movable rotor to be arranged within a width along the axis of the stator in an initial state in which the movable rotor approaches closest to the fixed rotor.

13. The electric motor according to claim 6, wherein a moving range of the movable rotor is set to a range in which the movable rotor overlaps a part of the stator when viewed from a direction perpendicular to a central axis of the stator.

14. The electric motor according to claim 1, wherein:
the fixed rotor and the movable rotor are identical in size with each other; and
the fixed rotor and the movable rotor are formed to allow the rotor made up of the fixed rotor and the movable rotor to be arranged within a width along an axis of the stator in an initial state in which the movable rotor approaches closest to the fixed rotor.

15. The electric motor according to claim 1, wherein:
the movable rotor is formed to have a shorter length along an axis of the movable rotor than a length along an axis of the fixed rotor; and
the fixed rotor and the movable rotor are formed to allow the rotor made up of the fixed rotor and the movable rotor to be arranged within a width along the axis of the stator in an initial state in which the movable rotor approaches closest to the fixed rotor.

16. The electric motor according to claim 1, wherein a moving range of the movable rotor is set to a range in which the movable rotor overlaps a part of the stator when viewed from a direction perpendicular to a central axis of the stator.

17. The electric motor according to claim 1, further comprising a gear shift mechanism forming a part of the power transmission, the gear shift mechanism including a first speed gear train and a second speed gear train, wherein each of the gear mechanism and the drive member is configured such that movement of the drive member along the rotation axis makes a switch between a state in which the first speed gear train is established and a state in which the second speed gear train is established.

18. The electric motor according to claim 17, wherein the first speed gear mechanism includes a first drive gear supported by the motor shaft and a first driven gear, and the second speed gear mechanism includes a second drive gear supported by the motor shaft and a second driven gear, and the gear shift mechanism includes an operating member connected to the drive member and selectively engaged with the first and second drive gears for selectively establishing the respective first and second speed gear trains.

* * * * *